(12) United States Patent
Green et al.

(10) Patent No.: US 8,001,122 B2
(45) Date of Patent: Aug. 16, 2011

(54) RELATING SIMILAR TERMS FOR INFORMATION RETRIEVAL

(75) Inventors: Stephen Joseph Green, Burlington, MA (US); Jeffrey H. Alexander, Arlington, MA (US); Bernard Horan, Wivenhoe (GB)

(73) Assignee: Sun Microsystems, Inc., Santa Clara, CA (US)

( * ) Notice: Subject to any disclaimer, the term of this patent is extended or adjusted under 35 U.S.C. 154(b) by 91 days.

(21) Appl. No.: 11/954,459

(22) Filed: Dec. 12, 2007

(65) Prior Publication Data
US 2009/0157645 A1    Jun. 18, 2009

(51) Int. Cl.
*G06F 17/30* (2006.01)

(52) U.S. Cl. .................. 707/736; 707/E17.014

(58) Field of Classification Search .................. 707/3, 7, 707/101, 104.1, 999.005, 5, E17.014, 736; 706/45–47
See application file for complete search history.

(56) References Cited

U.S. PATENT DOCUMENTS

| | | | |
|---|---|---|---|
| 6,233,578 B1* | 5/2001 | Machihara et al. | 707/10 |
| 6,678,694 B1* | 1/2004 | Zimmermann et al. | 707/102 |
| 2004/0010483 A1* | 1/2004 | Brands et al. | 706/45 |
| 2005/0108200 A1* | 5/2005 | Meik et al. | 707/3 |
| 2008/0071782 A1* | 3/2008 | Yoshimura et al. | 707/6 |

FOREIGN PATENT DOCUMENTS

JP    2001084252 A  *  3/2001

OTHER PUBLICATIONS

Latifur Khan and Feng Luo, "Ontology Construction for Information Selection", 2002 IEEE.*
Alan J. Lipton, Hironobu Fujiyoshi and Raju S. Patil, "Moving Target Classification and Tracking from Real-time Video", 1998 IEEE.*

* cited by examiner

*Primary Examiner* — Tim T. Vo
*Assistant Examiner* — Shiow-Jy Fan
(74) *Attorney, Agent, or Firm* — Brooks Kushman P.C.

(57) ABSTRACT

A resource analyzer selects a resource (e.g., document) from a grouping of resources. The grouping of resources can be any type of social tagging system used for information retrieval. The selected resource has an assigned uncontrolled tag and an assigned controlled tag. The controlled tag is a term derived from a controlled vocabulary of terms. Having selected the resource for analyzing, the resource analyzer identifies a first set of resources in the grouping of resources having also been assigned a same value as the uncontrolled tag as the selected resource. Similarly, the resource analyzer identifies a second set of resources in the grouping of resources having also been assigned a same value as the controlled tag. With this information, the resource analyzer then produces a comparison result indicative of a similarity between the first set of resources and the second set of resources.

16 Claims, 10 Drawing Sheets

RELATING SIMILAR TERMS FOR INFORMATION RETRIEVAL

BACKGROUND

It is well known in the information retrieval community that humans can be inconsistent when assigning keywords to resources (e.g., documents, Web sites, bookmarks, audio files, images, etc.). That is, given a resource, different people will tend to assign different keywords to the resource. One way to improve this human inconsistency (and therefore human query capability) is to use a controlled vocabulary of terms.

A controlled vocabulary is a finite and predetermined set of textual terms that have been compiled in order to assist in classifying groupings of resources. An uncontrolled vocabulary, on the other hand, is an open set of textual terms for defining a corresponding resource. For example, an uncontrolled vocabulary can include terms already in a controlled vocabulary, terms not in the controlled vocabulary but that can be found in a standard dictionary, and/or sui generis terms created by human users which have meanings specific to those users.

In conventional information retrieval systems, the manual application of keywords from a controlled vocabulary to resources can be costly and time consuming. Social tagging systems such as those provided by "del.icio.us" (i.e., a social book-marking Web site) provide a way for users to easily apply tags (e.g., keywords typically from an uncontrolled vocabulary) to such resources (e.g., Web sites). As a result, resources can be tagged with (and then queried by) terms from both controlled and uncontrolled vocabularies.

SUMMARY

Conventional techniques such as those supporting tagging of resources with uncontrolled tags suffer from a number of deficiencies. For example, searching for resources tagged with uncontrolled key words can be ineffective because the tag (or tags) selected by a searcher to find a resource may not be the same as an uncontrolled tag assigned to that resource.

Embodiments disclosed herein relate to improved information and data retrieval systems. More specifically, embodiments herein enable users to create and manage their own tags while ensuring that those tags are linked with keywords from formal controlled vocabularies. Such techniques allow users to maintain flexibility by using their own user-defined tags in their own vernacular, while also providing users the benefit of having a formal description of an ontology (i.e., a system that has a relationship between concepts identified by keywords).

Embodiments provided herein are capable of bridging uncontrolled tagging systems with controlled vocabularies. By doing so, such embodiments retain the advantages of using controlled vocabularies (e.g., for searching and browsing document collections) while avoiding the time-consuming and expensive task of manually assigning keywords from a controlled vocabulary to queryable resources.

More specifically, embodiments herein provide a way for users to search and browse sets of resources (e.g., documents) by using tags from a controlled vocabulary and to also take advantage of the "wisdom of the crowds" implicit in the free assignment of uncontrolled tags to those resources. According to one embodiment, an analyzer function analyzes uncontrolled information (e.g., user-generated tags that may have meaning only to that individual) associated with a resource to find appropriate or equivalent terms (e.g., keywords) in a controlled vocabulary and then assigns those terms to the resource (e.g., as tags). By having more terms from a controlled vocabulary assigned to resources, users will be able to find documents more efficiently and accurately in an information retrieval environment.

The following example describes steps that a resource analyzer performs to associate uncontrolled tags with controlled tags according to embodiments herein. Assume that a social tagging system (e.g., a document management system) has an associated controlled vocabulary. Further assume that most resources (e.g., document) in the social tagging system have been assigned (e.g., manually by one or more human users) at least one uncontrolled tag U and at least one controlled tag C. For example, users in a tagging community can assign uncontrolled keywords (e.g., an uncontrolled tag U) to the resources. More skilled users (e.g., persons trained in assigning keywords to resources) can review contents of the resources and assign one or more controlled keywords (e.g., controlled tag C) to the resources.

A resource analyzer according to embodiments herein can retrieve the sets of documents or resources in the social tagging system that have also been assigned the tags U and C. Assume for this example that the set of documents having the uncontrolled tag U assigned to them is designated $D_U$, and the set of documents having the controlled tag C assigned to them is designated $D_C$.

In one embodiment, the resource analyzer determines whether the uncontrolled tag U is sufficiently similar to the controlled tag C. If U and C are deemed to be sufficiently similar, then the resource analyzer can assign the tag C to a document when a user assigns the tag U to that document.

Multiple example techniques are disclosed for determining the similarity between an uncontrolled tag U and a controlled tag (e.g., keyword) C. Note that embodiments herein are not limited to such example methods and it is contemplated that embodiments herein are capable of utilizing any techniques suitable for calculating similarity among terms and keywords.

In the first example method, the resource analyzer computes the top n most important terms for the sets of resources $D_U$ and $D_C$. As such, the top n most important terms for the set $D_U$ is designated as the set $T_U$, while the top n most important terms for the set $D_C$ is designated as the set $T_C$. Generally, important terms are terms that distinguish the sets $D_U$ and $D_C$ from the entire set of resources in the social tagging system.

The relative importance of terms (e.g., top n most important terms in a set) can be computed using any of a number of standard term weighting functions. For example, the weight of a particular term t in a particular document d, can be computed as the product of the frequency of the term t in document d and the inverse of the frequency of term t across all documents.

Given the sets of the most important terms for $D_U$ and $D_C$, in one embodiment the resource analyzer computes the similarity between U and C by calculating the percentage of overlap of terms in the sets $T_U$ and $T_C$. If this percentage exceeds a predetermined threshold value, then the resource analyzer can assign C to a resource (e.g., document) when a user tags that resource with U.

Note that an appropriate threshold can be determined by human inspection, or by considering the overlap of $T_U$ and $T_C$ when U=C (i.e., when a document has been tagged with a term that exists in both the uncontrolled and controlled vocabularies).

In the second example method, the resource analyzer builds classifiers for each set of resources $D_U$ and $D_C$. The resource analyzer can use any standard classification approach that includes a representation of the class as a vector of weighted features (e.g., a Rocchio classifier). Having computed the classifiers for U and C, the resource analyzer calculates the similarity of the classifiers using a standard cosine similarity measurement. Thus, classifiers that have a similarity exceeding a given threshold value will indicate that the tag C can be assigned to a resource when a user tags that resource with U.

Again, the threshold value can be determined through human inspection, or by considering classifiers for the same term from the uncontrolled and controlled vocabularies.

It should be noted that an advantage of the second example method is that the resource analyzer can build classifiers for non-textual media (e.g., audio, images, etc.) as well since a similarity metric and corresponding classifiers can be generated based on a comparison of textual and non-textual media.

According to embodiments herein, the resource analyzer selects a resource (e.g., document, music file, image file, etc.) from a grouping of resources. As previously discussed, the resource has been assigned an uncontrolled tag and a controlled tag. The resource analyzer identifies a first set of resources in the grouping of resources having also been assigned a same value as the uncontrolled tag. Likewise, the resource analyzer identifies a second set of resources in the grouping of resources having also been assigned a same value as the controlled tag. Based on these groupings, the resource analyzer produces a comparison result indicative of a similarity between the first set of resources and the second set of resources.

In one example embodiment, the resource analyzer conditionally generates a rule based on a similarity of attributes in the first set of resources and attributes in the second set of resources. More specifically, the resource analyzer generates the rule in response to determining that attributes associated with the first set of resources are sufficiently similar to attributes associated with the second set of resources. The resource analyzer can configure the rule to specify that for any resources that have been assigned a value of the uncontrolled tag and do not have an associated assigned controlled tag, those resources should also be assigned a value of the controlled tag.

In addition to the embodiments as discussed above, other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as a combination of software and hardware, or as hardware alone. The embodiments disclosed herein, may be employed in computerized devices and software systems for devices such as those manufactured by Sun Microsystems, Inc. of Santa Clara, Calif.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments disclosed herein provide a way for users to search and browse sets of resources (e.g., documents, music, images, etc.) by using tags from a controlled vocabulary while also taking advantage of the more subjective meanings implicit in the uncontrolled tags applied to those resources. For example, a resource analyzer is able to analyze uncontrolled information (e.g., user-generated tags that may have meaning only to that individual) associated with a resource in order to find similar tags in a controlled vocabulary and then assign those similar tags to the resource. By having more tags assigned to resources that are derived from a controlled vocabulary, users are able to find documents more efficiently and accurately in an information retrieval environment.

Figure 1:
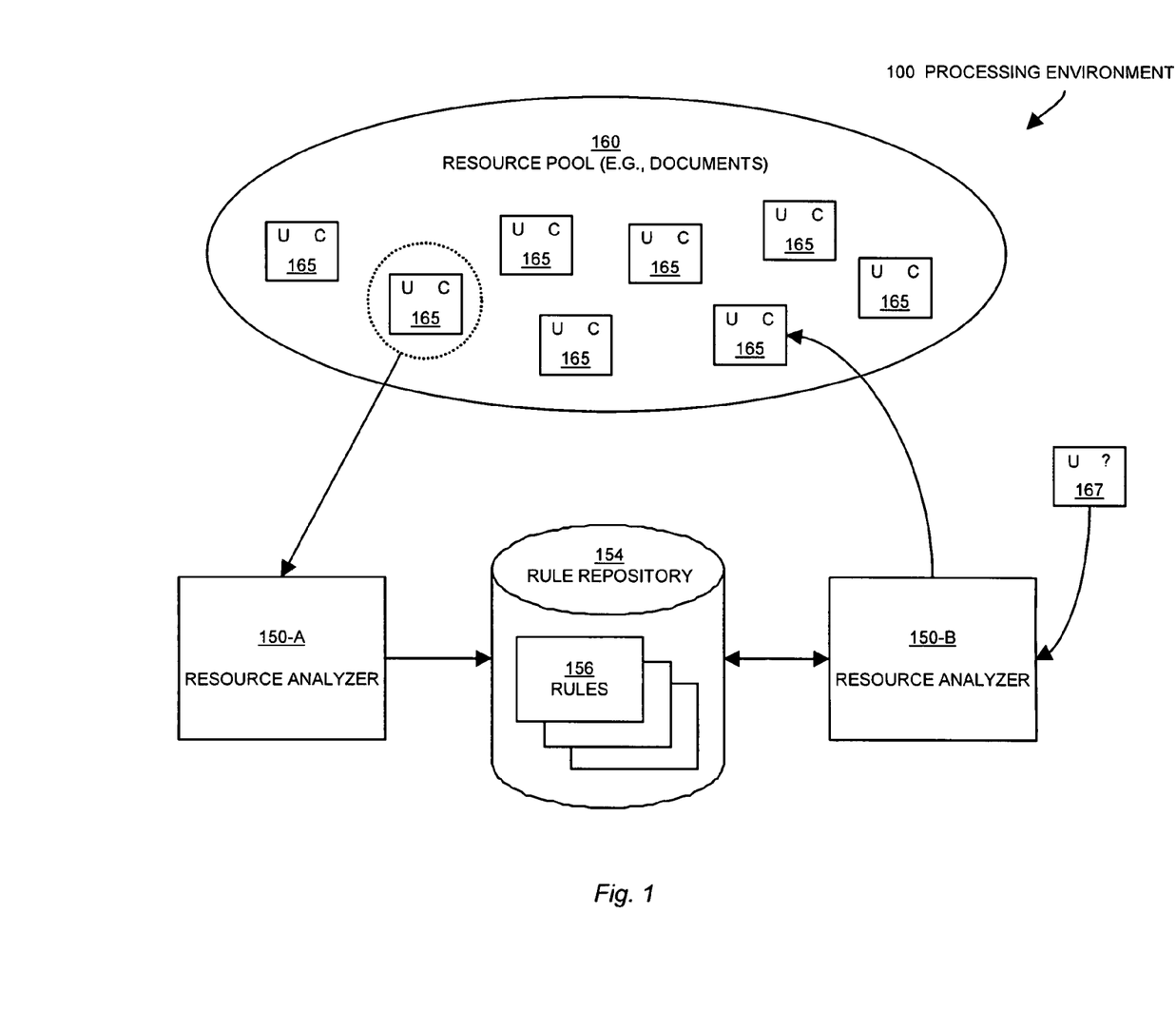
FIG. 1 is an example block diagram of a processing environment illustrating an improved information and data retrieval system according to embodiments herein.

FIG. 1 is an example block diagram of a processing environment 100 illustrating an improved information and data retrieval system according to embodiments herein.

In the example embodiment shown, processing environment 100 includes resource analyzer 150-A and resource analyzer 150-B (hereinafter collectively referred to as resource analyzer 150). Note that both resource analyzer 150-A and resource analyzer 150-B can reside at the same or different locations and can be the same or different processes executing on one or more devices. In the context of the present example, processing environment 100 further includes rule repository 154 containing one or more rules 156, resource pool 160 (e.g., grouping of resources) containing resources 165, and new resource 167.

For purposes of example, each resource 165 in resource pool 160 has an associated uncontrolled tag U and controlled tag C. It should be noted, however, that each resource 165 in resource pool 160 does not necessarily have to be assigned both an uncontrolled tag U and a controlled tag C. In other words, resources in resource pool 160 can be assigned one or more uncontrolled tags and/or one or more controlled tags.

Further note that new resource 167 has an associated uncontrolled tag U, but does not have an associated controlled tag C (as designated by the "?" symbol). It should be appreciated by those skilled in the art that each resource 165 can have one or more uncontrolled tags U and/or one or more controlled tags C.

According to one embodiment, the controlled tags C are textual words derived from a predefined vocabulary associated with the grouping of resources. In the same vein, the uncontrolled tag U is a textual word not necessarily derived from the predefined vocabulary (i.e., U can be any user-generated tag).

According to one embodiment, a skilled resource manager assigns a controlled tag or keyword to resources in resource pool 160 based on textual words (or other parameters) in the resource. An uncontrolled tag U can be assigned to a respective resource in the resource pool 160 based on tagging by a less skilled user. Thus, the uncontrolled tag is more likely to have been inconsistently assigned to a resource in pool 160 than a controlled tag.

One embodiment herein includes generating one or more rules that are used to automatically assign (as opposed to manual assignment by a skilled technician) a controlled keyword to resources that have only been assigned an uncontrolled tag. As previously discussed, assignment of a proper controlled keyword to a resource enables more efficient searching.

During general operation, the resource analyzer 150 selects one or more resources (e.g., resource 165) from the resource pool 160 to be analyzed. The selection of one or more resources (e.g., resource 165) by resource analyzer 150 can be at random or according to various selection algorithms. In the example of FIG. 1, a dotted-line circle represents the selection of the resource 165 by resource analyzer 150-A.

Upon selecting a resource for analyzing, the resource analyzer 150-A performs processing on the resource 165, the resource's tags U and C, and/or resources in the resource pool 160 to conditionally generate a rule 156 to be stored in rule repository 154. Rule 156 is conditionally generated since, depending on the outcome of the resource analyzer 150-A processing of resource 165, the rule may or may not need to be created. Details of such processing are discussed later in this specification.

After creation of one or more rules 156, when a new resource 167 enters (or is about to enter) the resource pool 160, resource analyzer 150-B analyzes the new resource 167 in accordance with any applicable rules 156 from rule repository 154. The processing performed by resource analyzer 150-B includes assigning an appropriate controlled tag or keyword to the new resource.

For example, the resource analyzer 150-B can determine one or more controlled tags C, if any, that are to be assigned to the new resource 167 based on a corresponding one or more uncontrolled tags already assigned to the new resource. If it is determined that the new resource's 167 uncontrolled tag has at least one similar controlled tag(s) (e.g., per rules 165), then resource analyzer 150-B assigns that controlled tag(s) to the new resource 167.

Note that after resource analyzer 150-B assigns new resource 167 a corresponding controlled tag C, the resource analyzer 150-B places new resource 167 in resource pool 160 (new resource 167 is now designated as a pooled resource 165). By assigning a tag from a controlled vocabulary to the new resource 167, a user (e.g., human, computer process, etc.) can more easily find the new resource 167 when searching/browsing resources in resource pool 160.

It should be pointed out that the resource analyzer 150 may also perform similar processing of resources 165 already in the resource pool 160 that have been assigned only an uncontrolled tag by a user.

Figure 2:
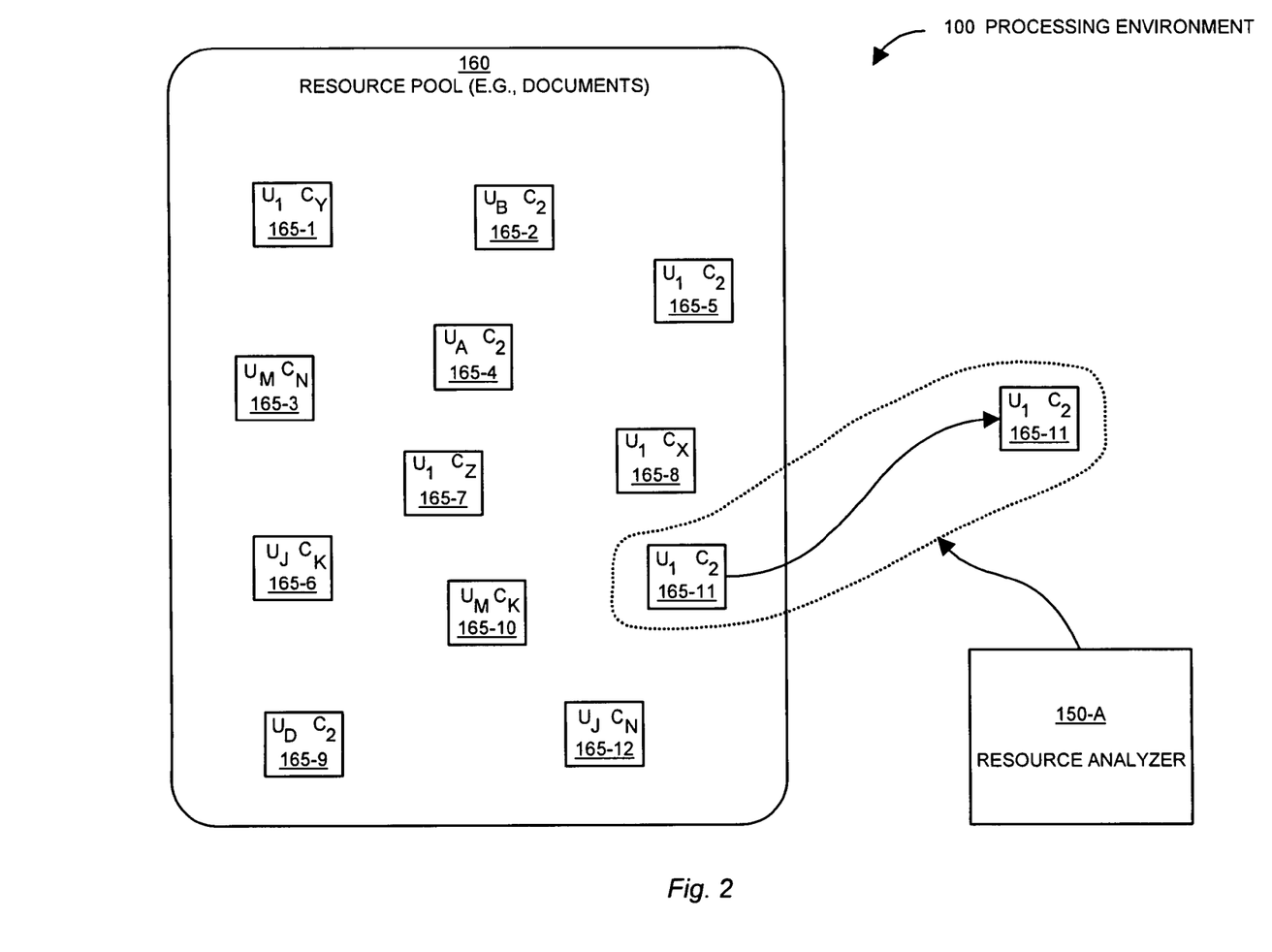
FIG. 2 is an example block diagram of a processing environment illustrating selection of a resource from a resource pool according to embodiments herein.

FIG. 2 is an example block diagram of a processing environment 100 illustrating selection of a resource 165 from resource pool 160 according to embodiments herein.

The resource pool 160 in FIG. 2 includes resource analyzer 150-A, resources 165 (i.e., resource 165-1, resource 165-2, resource 165-3, resource 165-4, resource 165-5, resource 165-6, resource 165-7, resource 165-8, resource 165-9, resource 165-10, resource 165-11, resource 165-12) having various uncontrolled and controlled tags. In this example configuration, resource pool 160 includes resources 165 having the sets of uncontrolled and controlled tags (e.g., <U, C>): $\{<U_1, C_2>$ resource 165-5, $<U_1,C_X>$ resource 165-8, $<U_1, C_Y>$ resource 165-1, $<U_1,C_Z>$ resource 165-7, $<U_A,C_2>$ resource 165-4, $<U_B,C_2>$ resource 165-2, $<U_D,C_2>$ resource 165-9, $<U_J,C_K>$ resource 165-6, $<U_M,C_N>$ resource 165-3, $<U_M,C_K>$ 165-10, and $<U_J,C_N>$ resource 165-12$\}$. As is shown, the resource 165-11 having the set of uncontrolled and controlled tags $<U_1,C_2>$ has been selected for analyzing by resource analyzer 150. Once a resource 165 has been selected, the resource analyzer 150 then processes/analyzes the resource 165 (and associated tags) to determine whether a rule should be generated for those particular tags as more particularly illustrated in FIG. 3.

Figure 3:
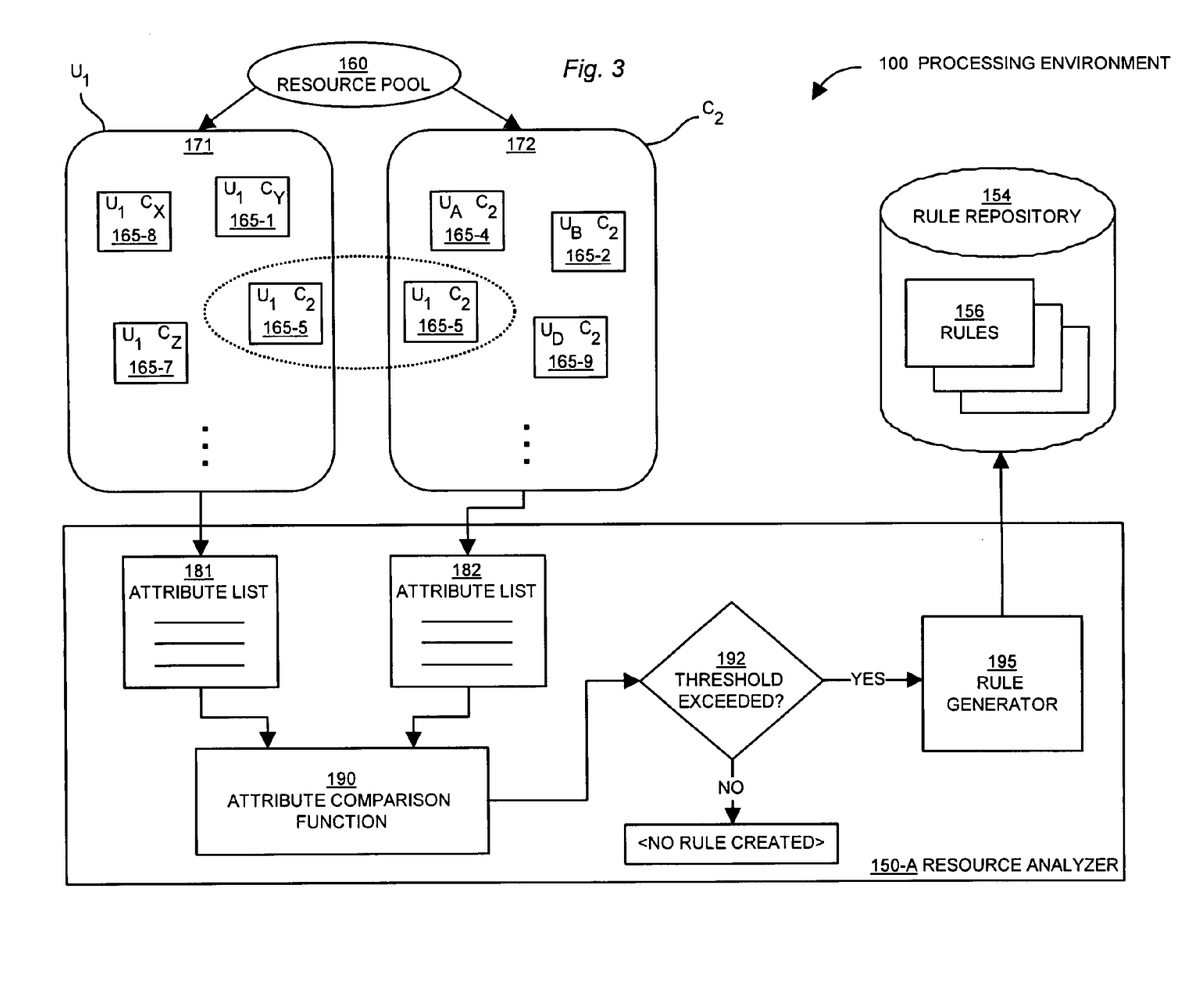
FIG. 3 is an example block diagram of a processing environment illustrating an improved information and data retrieval system according to embodiments herein.

FIG. 3 is an example block diagram of a processing environment 100 illustrating an improved information and data retrieval system according to embodiments herein.

In the example embodiment shown, processing environment 100 includes resource analyzer 150-A, rule repository 154 containing rules 156, resource pool 160, a first set of resources 171, a second set of resources 172, a first attribute list 181, and a second attribute list 182. Resource analyzer includes an attribute comparison function 190, a threshold evaluator 192 and a rule generator 195. The resource analyzer 150-A chooses the first set of resources to include any resources in pool 160 that have an uncontrolled tag that matches the uncontrolled tag (i.e., $U_1$) of the selected resource 165-11. Thus, the first set of resources 171 includes resources 165 having the sets of uncontrolled and controlled tags: {<$U_1,C_2$> resource 165-5, <$U_1,C_X$> resource 165-8, <$U_1,C_Y$> resource 165-1, and <$U_1,C_Z$> resource 165-7}. The resource analyzer 150-A chooses the second set of resources to include any resources in pool 160 that have a controlled tag that matches the controlled tag (i.e., $C_2$) of the selected resource 165-11. Thus, the second set of resources 172 includes resources 165 having the sets of uncontrolled and controlled tags: {<$U_1,C_2$> resource 165-5, <$U_A,C_2$> resource 165-4, <$U_B,C_2$> resource 165-2, and <$U_D,C_2$> resource 165-9}.

Using any conventional searching algorithm, the resource analyzer 150-A identifies resources to be included in the first set of resources 171 and the second set of resources 172. Note that the first set of resources 171 is labeled with a $U_1$ since each resource in this set has been assigned the uncontrolled tag $U_1$. Similarly, the second set of resources 172 is labeled with a $C_2$ since each resource in this set has been assigned the controlled tag $C_2$.

It should also be noted that the first set of resources 171 and second set of resources 172 may or may not be mutually exclusive. For instance, the sets of resources 171 and 172 overlap such that both sets contain the resource having tags <$U_1,C_2$> (as shown by the dotted-line ellipse). However, the sets of resources 171 and 172 do not necessarily have to overlap and, at times, may not have any resources 165 in common.

Having identified and compiled the first set of resources 171 and the second set of resources 172, the resource analyzer 150-A then calculates respective attributes lists 181 and 182. Each attribute list 181 and 182 contains attributes that comprise a relative capability of distinguishing the respective first set of resources 171 and second set of resources 172 from the entire group of resources (e.g., resource pool 160).

According to one example embodiment, each attribute list (e.g., attribute list 181 and attribute list 182) contains terms listed in a relative order of importance (e.g., each attribute list can include the top n most important terms in the first or second set of resources). The relative importance of terms can be computed using any of a number of standard term weighting functions. For example, if a given term has a rather large number of occurrences in the first set of resources 171 as compared to a relatively low number of occurrences in the entire resource pool 160, then the given term is considered more important, to a relative degree, among terms in the first set of resources 171.

A similarity value between tags $U_1$ and $C_2$ can be calculated using the terms in the attribute lists. In one embodiment, the resource analyzer determines the similarity value of the terms in the attribute lists by calculating a percentage of overlap of terms in attribute lists 181 and 182. If this percentage exceeds a predetermined threshold value, then the resource analyzer 150-A creates a rule that causes the resource analyzer 150-B to assign $C_2$ to a resource (e.g., document) when a user tags a document with $U_1$.

Based on the example in FIG. 3, assume that the resource analyzer 150-A calculated the ten most important terms for the first set of resources 171 and the ten most important terms for the second set of resources 172 as indicated in attribute list 181 and attribute list 182, respectively. The attribute comparison function 190 compares attributes in the attribute lists (i.e., attribute list 181 and attribute list 182) to determine a percentage of terms that overlap in both lists. For example, if attribute lists 181 and 182 have six terms in common out of ten terms in each list, then the attribute comparison function 190 would calculate an overlap percentage of 60% (i.e., 6 out of 10 terms overlap).

Of course, other methods can be used to determine a degree of similarity associated with the attributes in each list. For example, according to another example embodiment, each attribute list can be a classifier metric that represents a vector of attributes and associated attribute weights. The attribute comparison function 190 determines the similarity between the first set of resources 171 and second set of resources 172 by performing a cosine similarity measurement on the respective classifier vectors. In this manner, the cosine similarity measurement ultimately represents a relative similarity between the uncontrolled tag U and controlled tag C.

In another embodiment, the resource analyzer 150-A processes a first classifier metric (e.g., associated with the first set of resources 171) with respect to a second classifier metric (e.g., associated with the second set of resources 172) in order to determine whether the first classifier metric is classifiable in the second set of resources. The resource analyzer 150-A then generates a rule 156 in response to determining that the first classifier metric is indeed classifiable in the second set of resources 172.

It should be appreciated that an advantage of using classifier metrics to determine a relative similarity of terms is that a similarity model can be generated for non-textual media such as audio resources (e.g., music files), image resources, video resources, etc.

Now, to determine whether a rule should be generated for a set of uncontrolled and controlled tags being analyzed as discussed above, the resource analyzer 150-A measures the similarity value (e.g., overlap percentage, cosine similarity measurement, etc.) against a threshold value. The threshold value can be a predetermined value set by a human user or a value as determined by the resource analyzer 150-A through many iterations of analyzing resources 165 in resource pool 160 (e.g., via any standard machine learning algorithm).

If a similarity value exceeds the threshold value in step 192, then the resource analyzer 150-A generates a rule 156 for the uncontrolled tag and controlled tag (e.g., via rule generator 195). For example, suppose the threshold value is 50%. In the above example where the percentage of overlap is 60%, the rule generator creates a rule that resources having an uncontrolled tag of $U_1$ should be assigned a controlled tag $C_2$. On the other hand, if the similarity value does not exceed the threshold value in step 192, then the resource analyzer 150-A does not generate a rule for the uncontrolled tag and corresponding controlled tag because the terms in the corresponding sets of resources having a tag $U_1$ are not sufficiently similar to the terms in resources having an assigned tag $C_2$. Note that threshold evaluator step 192 as shown in FIG. 3 represents such processing.

As described herein, the resource analyzer 150-A generates a rule for a pair of uncontrolled and controlled tags such that each time a user assigns the uncontrolled tag to a resource 165 in resource pool 165 (or a new resource 167 that enters the resource pool with only the uncontrolled tag), that resource 165 is also assigned the controlled tag. Thus, the resource analyzer 150-A can accurately assign useful and pertinent keywords from a controlled vocabulary to a resource 165 since those controlled keywords have been deemed to be sufficiently similar to the user-generated keyword.

A single rule 156 can support multiple similar controlled tags (e.g., keywords) associated with a given uncontrolled tag. In other words, a rule does not necessarily have to indicate a one-to-one relationship between a given uncontrolled tag and a similar controlled tag (e.g., for every $U_1$ tag assigned→assign tag $C_2$; vis-à-vis, for every $U_1$ tag assigned→assign tags $C_2, C_3, \ldots$).

Figure 4:
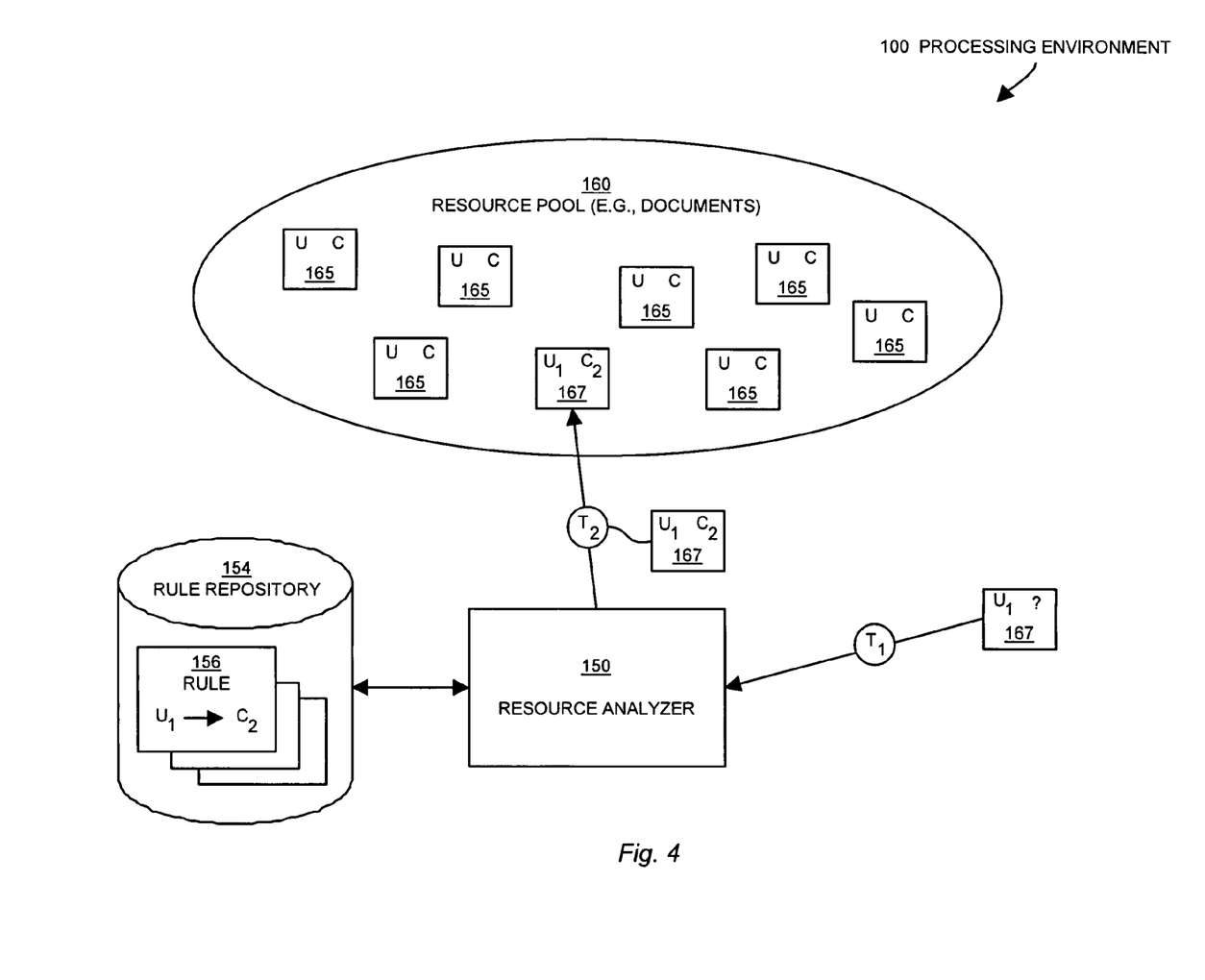
FIG. 4 is an example block diagram of a processing environment illustrating an improved information and data retrieval system according to embodiments herein.

Note that upon generating a rule 156, the resource analyzer 150 stores the rule in rule repository 154, as shown in the example embodiment of FIG. 4.

FIG. 4 is an example block diagram of a processing environment 100 illustrating an improved information and data retrieval system according to embodiments herein.

In the example embodiment shown, processing environment 100 includes resource analyzer 150, rule repository 154 containing rule 156, resource pool 160, resources 165 and new resource 167. In the context of the present example, assume that rule 156 specifies that for any resource (e.g., a document) that has been tagged or assigned an uncontrolled value $U_1$, that resource should also be assigned the controlled value $C_2$.

During general operation, the resource analyzer 150 receives (at time $T_1$) new resource 167 and identifies that this resource has an uncontrolled tag $U_1$ but does not have a corresponding controlled tag. The resource analyzer 150 can determine this by performing a search of $U_1$ against the words contained in the controlled vocabulary. If $U_1$ does not have a corresponding value in the controlled vocabulary, then $U_1$ is considered an uncontrolled tag. Note also that the resource analyzer can identify the tag $U_1$ as an uncontrolled tag based on a data field associated with the resource indicating the tag provided by a non-skilled tagger that assigns an uncontrolled value to the resource 167.

Upon detecting new resource 167, the resource analyzer 150 determines whether any rules in the rule repository 154 are applicable to new resource 167. Because rule 156 in FIG. 4 is applicable (i.e., rule 156 applies to any resource having the uncontrolled tag $U_1$), resource analyzer 150 applies the rule to new resource 167.

The resource analyzer 150 applies rule 156 to new resource 167 such that new resource 167 (i.e., as a pooled resource 165) has an assigned value for the controlled tag of $C_2$. At time $T_2$, new resource 167 is then added to resource pool 160 (i.e., as a pooled resource 165), which enables users of the processing environment (e.g., social tagging system) to query, search, browse, tag, etc. newly added pooled resource 167.

It should be noted that without the processing performed by resource analyzer 150 on new resource 167, a user of the processing environment 100 would have to enter the keyword $U_1$ in order to successfully query the new resource 167 (e.g., document). Since the tag $U_1$ is uncontrolled, it is less likely that another user will use the same tag or keyword when searching for content in resource pool 160. However, by assigning a keyword from a controlled vocabulary having a finite number of relevant tags, a user has a much greater likelihood of searching for and successfully finding content (e.g., new resource 167) when using controlled tags in their search.

Figure 5:
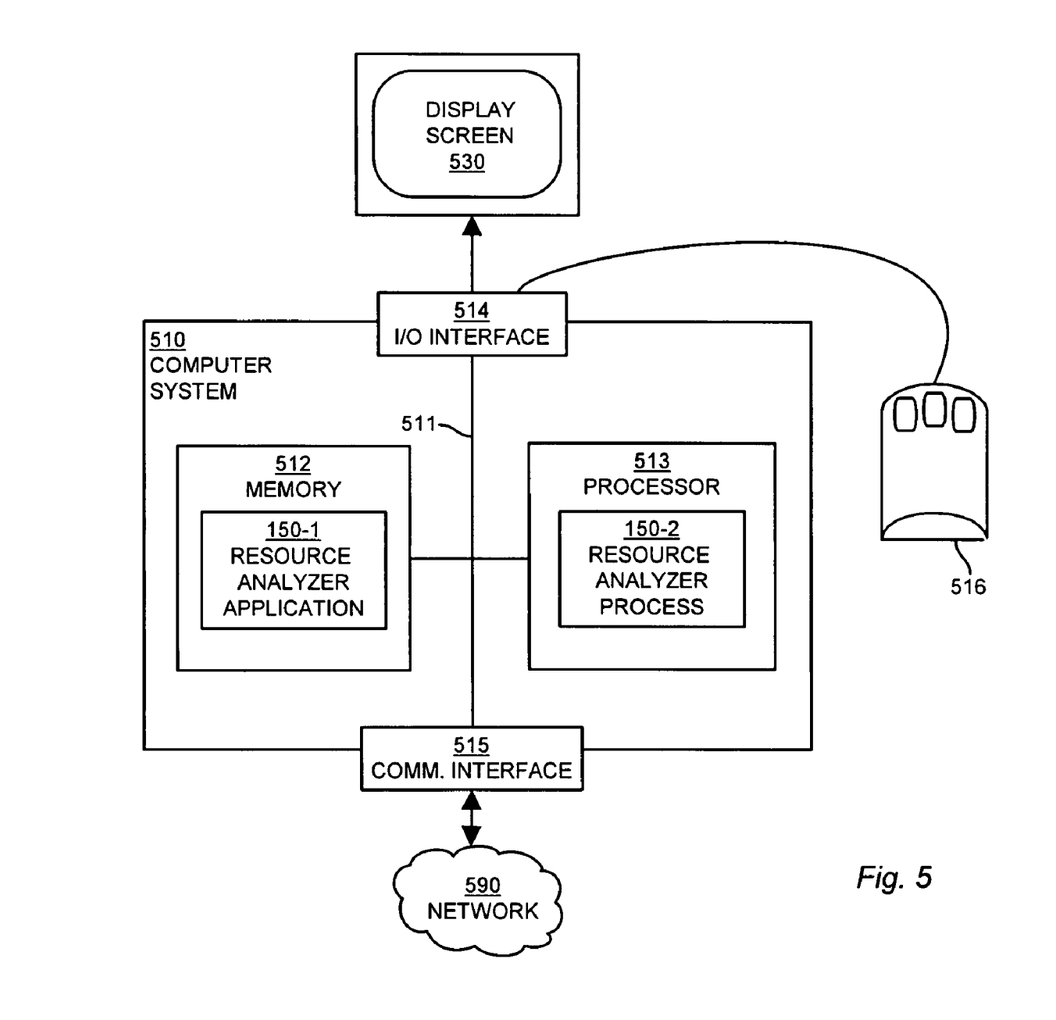
FIG. 5 is a block diagram illustrating an example computer system for executing a resource analyzer and related functions/processes according to embodiments herein.

FIG. 5 is a block diagram illustrating an example computer system 510 for executing a resource analyzer 150 and related functions/processes according to embodiments herein. Computer system 510 may be a computerized device such as a personal computer, workstation, portable computing device, console, network terminal, processing device, etc.

As shown, computer system 510 of the present example includes an interconnect 511 that couples a memory system 512, a processor 513, an I/O interface 514, and a communications interface 515. I/O interface 514 enables computer system 510 to display a graphical user interface (if so used) on display screen 530. An input device 516 (e.g., one or more user/developer controlled devices such as a pointing device, keyboard, mouse, etc.) couples to processor 513 through I/O interface 514, and enables a user to provide input commands and generally control a corresponding graphical user interface that the resource analyzer application 150-1 and resource analyzer process 150-2 provides for display on display 530. Communications interface 515 of computer system 510 enables computer system 510 to communicate over network 590 to transmit and receive information from different resources.

As shown, memory system 512 is encoded with resource analyzer application 150-1 supporting term similarity processing and other functions such as application of rules and assignment of controlled tags according to embodiments herein. Resource analyzer application 150-1 can be embodied as software code such as data and/or logic instructions (e.g., code stored in the memory or on another computer readable medium such as a disk) that support functionality according to different embodiments described herein.

During operation of resource analyzer application 150-1, processor 513 accesses memory system 512 via the interconnect 511 in order to launch, run, execute, interpret or otherwise perform the logic instructions of the resource analyzer application 150-1. Execution of the resource analyzer application 150-1 produces processing functionality in resource analyzer process 150-2. In other words, the resource analyzer process 150-2 represents one or more portions of the resource analyzer application 150-1 (or the entire application) performing within or upon the processor 513 in the computer system 510.

It should be noted that resource analyzer process 150-2 executed in computer system 510 can be represented by either one or both of the resource analyzer application 150-1 and/or the resource analyzer process 150-2. For purposes of this discussion and different embodiments herein, general reference will again be made to the resource analyzer process 150-2 as performing or supporting the various steps and functional operations as previously discussed and as will be discussed further in this specification.

As mentioned, in addition to the resource analyzer process 150-2, embodiments herein include the resource analyzer application 150-1 itself (i.e., the un-executed or non-performing logic instructions and/or data). The resource analyzer application 150-1 may be stored on a computer readable medium such as a floppy disk, hard disk, or optical medium. The resource analyzer application 150-1 may also be stored in a memory type system such as in firmware, read only memory (ROM), or, as in this example, as executable code within the memory system 512 (e.g., within Random Access Memory or RAM). In addition to these embodiments, it should also be noted that other embodiments herein include the execution of resource analyzer application 150-1 in processor 513 as the resource analyzer process 150-2. Thus, those skilled in the art will understand that the computer system 510 may include other processes and/or software and hardware components, such as an operating system that controls allocation and use of hardware resources.

FIGS. 6-10 include flowcharts according to embodiments herein. Each step denotes one or more computer software instructions or groups of instructions or hardware logic that carry out such functionality. The flow diagrams do not necessarily depict the syntax of any particular programming language. Rather, the flow diagrams illustrate the functional information one of ordinary skill in the art could use to fabricate hardware circuits and/or to generate computer software (or a hybrid of both hardware circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 6:
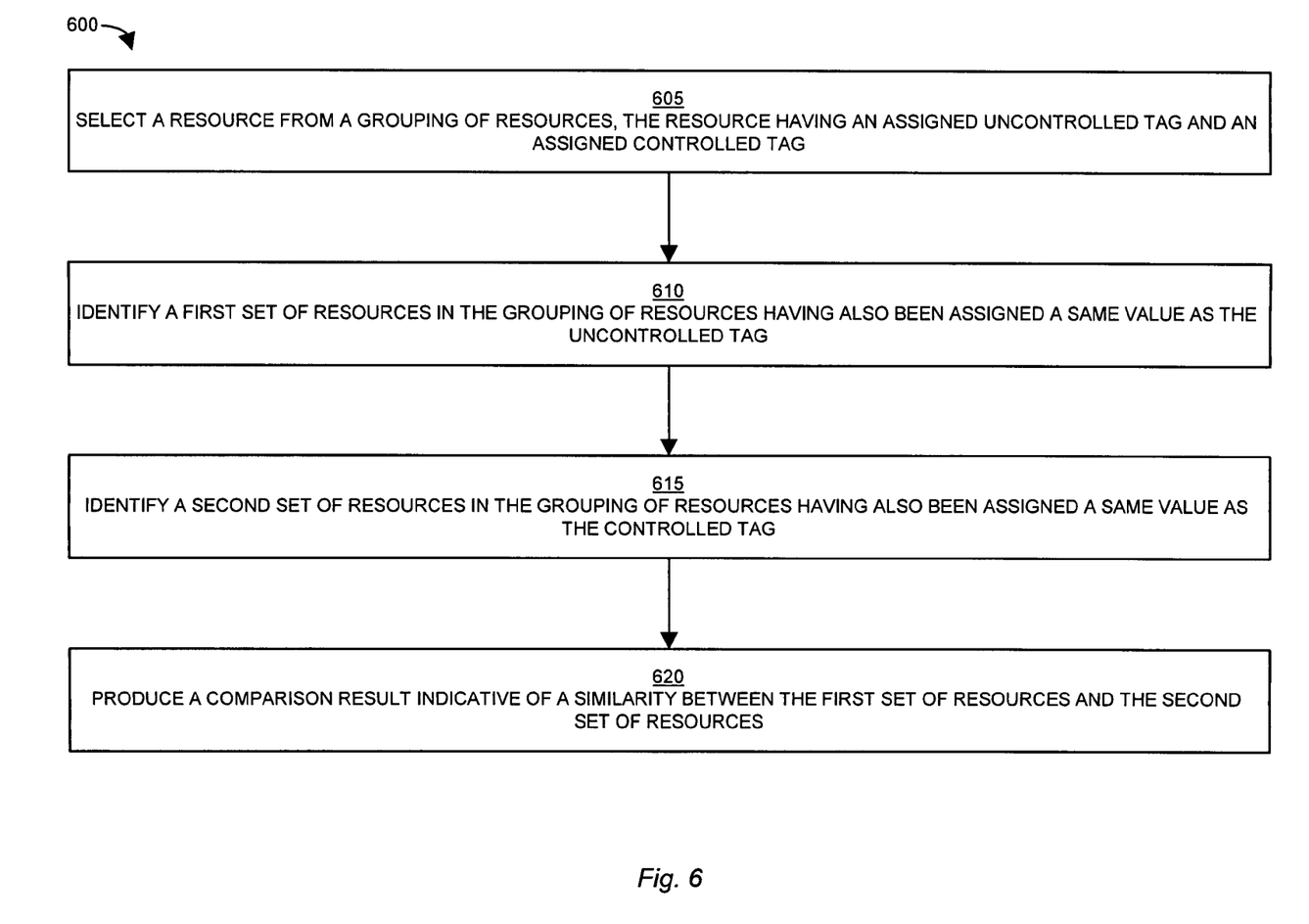
FIG. 6 is a flow chart of processing steps that shows processing operations performed by the resource analyzer in accordance with one example embodiment.

Now, more specifically, FIG. 6 is a flow chart 600 of processing steps that shows processing operations performed by the resource analyzer 150 in accordance with one example embodiment.

In step 605, the resource analyzer 150 selects a resource (e.g., resource 165-11) from a grouping of resources (e.g., a pool 160 in a social tagging system such as the example processing environment 100 shown in FIGS. 1-4). The resource 165-11 has already been assigned an uncontrolled tag and a controlled tag.

Generally, a controlled tag is a textual word derived from a predefined vocabulary associated with the grouping of resources. In comparison, an uncontrolled tag is typically a textual word not necessarily derived from the predefined vocabulary.

In step 610, the resource analyzer 150 identifies a first set of resources (e.g., set 171) in the grouping of resources (e.g., pool 160) having also been assigned a same value as the uncontrolled tag of the selected resource 165-11.

In step 615, the resource analyzer 150 identifies a second set of resources (e.g., set 172) in the grouping of resources (e.g., pool 172) having also been assigned a same value as the controlled tag of the selected resource 165-11.

In step 620, the resource analyzer 150 produces a comparison result indicative of a similarity between the first set of resources and the second set of resources.

According to one embodiment, the resource analyzer 150 conditionally generates a mapping based on a similarity of attributes in the first set of resources and attributes in the second set of resources. In this manner, the resource analyzer 150 generates the mapping in response to determining that attributes associated with the first set of resources are sufficiently similar to attributes associated with the second set of resources. As previously discussed, attributes can be terms having relative importance for a set of resources, classifier metrics (e.g., vector representations of attributes and their associated weights), etc.

In addition, the resource analyzer 150 configures the mapping to specify that, for a given resource having been assigned the uncontrolled tag, the given resource should also be associated with the controlled tag.

The resource analyzer 150 can also dynamically apply the mapping to a resource that has already been assigned the uncontrolled tag in the grouping of resources.

Figure 7:
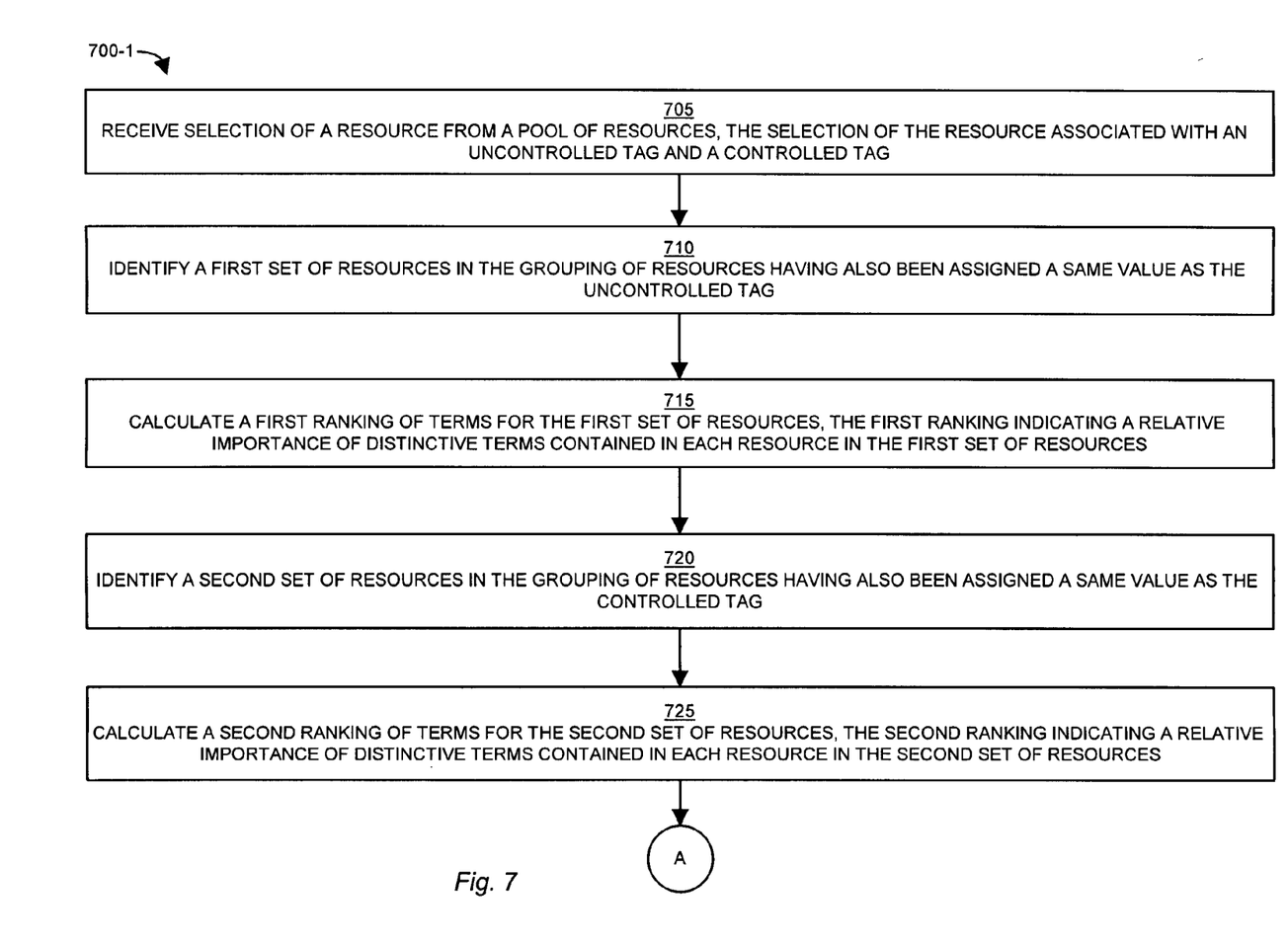
FIGS. 7 and 8 combine to form a flow chart of processing steps that shows processing operations performed by the resource analyzer in accordance with one example embodiment.
Figure 8:
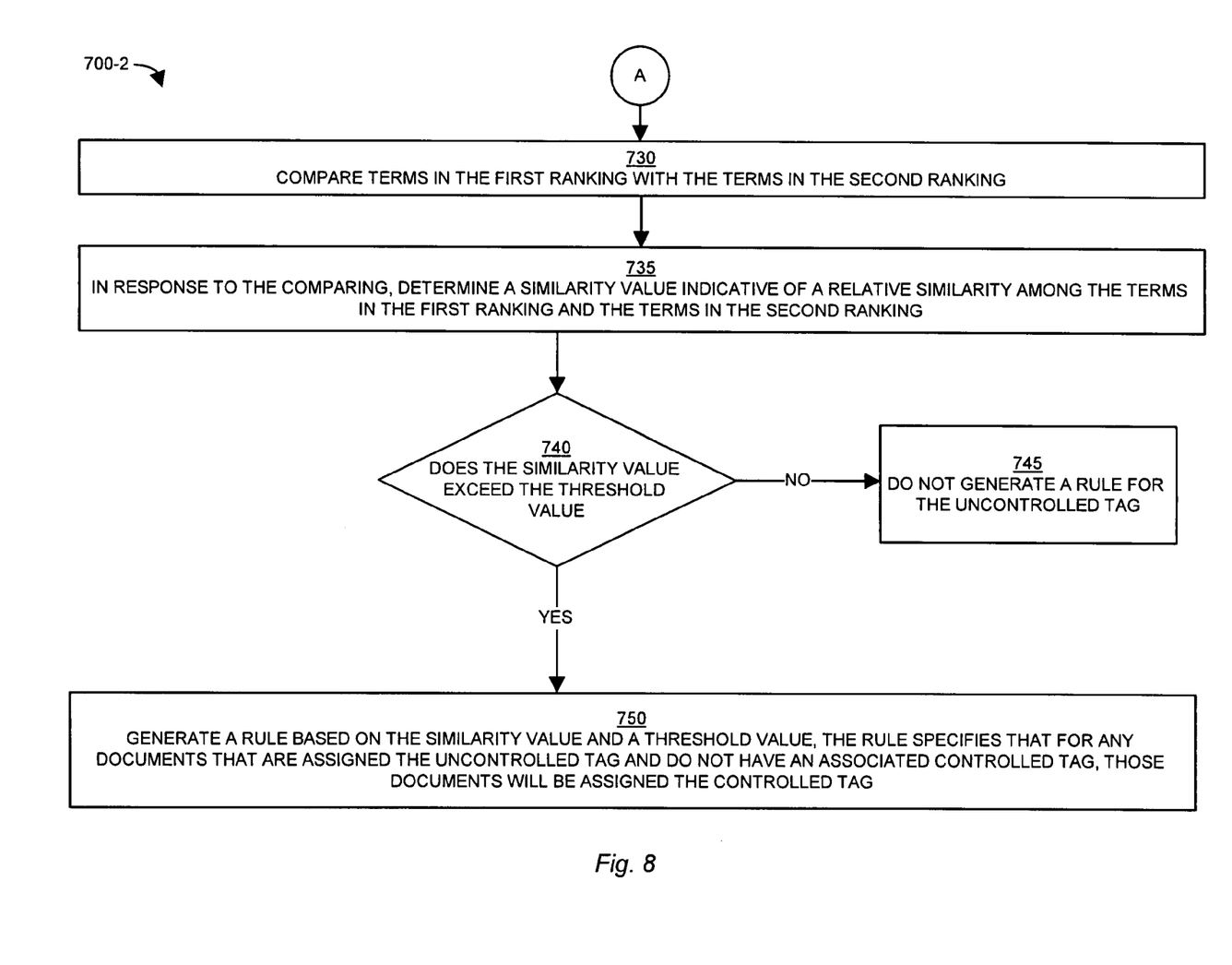

FIGS. 7 and 8 combine to form a flow chart 700 (e.g., flowchart 700-1 and flowchart 700-2) of processing steps that shows processing operations performed by the resource analyzer 150 in accordance with one example embodiment.

In step 705, the resource analyzer 150 receives a selection of a resource from a pool of resources (e.g., grouping of resources). Note that the grouping of resources, depending on the embodiment, can include non-textual media including an audio resource (e.g., music file), an image resource, a video resource, etc.

In step 710, the resource analyzer 150 identifies a first set of resources in the grouping of resources having also been assigned a same value as the uncontrolled tag.

In step 715, the resource analyzer 150 calculates a first ranking of terms in the first set of resources, the first ranking indicating a relative importance of distinctive terms contained in each document in the first set of resources.

In step 720, the resource analyzer 150 identifies a second set of resources in the grouping of resources having also been assigned a same value as the controlled tag.

In step 725, the resource analyzer 150 calculates a second ranking of terms in the second set of resources, the second ranking indicating a relative importance of distinctive terms contained in each document in the second set of resources.

In the same vein as the discussion above, the resource analyzer 150 calculates a relative importance I for a given term by considering a frequency of occurrence $T_f$ of the given term in the given document and the number of documents $D_f$ in the grouping of resources in which the term occurs. According to one embodiment, the relative importance for a given term is calculated using the equation: $I=T_f/D_f$.

Another example embodiment considers, at least in part, a value indicative of a maximum document frequency for a given term when calculating the relative importance for that given term with respect to a grouping of documents.

Those skilled in the art should readily appreciate that any conventional term weighting algorithm(s) can be employed to determine term importance/weight/rank/etc. in accordance with embodiments herein.

In step 730, the resource analyzer 150 compares terms in the first ranking with the terms in the second ranking.

In step 735, in response to the comparing, the resource analyzer 150 determines a similarity value indicative of a relative similarity among the terms in the first ranking and the terms in the second ranking.

In step 740, the resource analyzer 150 determines whether the similarity value exceeds the threshold value. If not, the resource analyzer 150 proceeds to step 745. If, however, the similarity does exceed the threshold value, then resource analyzer 150 proceeds to step 750 for rule creation and/or mapping of the controlled tag in relation to the uncontrolled tag.

In step 745, the resource analyzer 150 does not generate a rule (or mapping) since it has been determined that the controlled tag is not sufficiently similar to the uncontrolled tag.

In step 750, resource analyzer 150 conditionally generates a rule based on the similarity value and a threshold value. As such, the rule specifies that for any documents that are assigned the uncontrolled tag and do not have an associated controlled tag, those documents will be assigned the controlled tag. Similarly, the resource analyzer 150 can also create a mapping that relates (or maps) the controlled tag to the uncontrolled tag. Such a mapping can be used in associating the controlled tag with a document also having the related (or mapped) uncontrolled tag.

Figure 9:
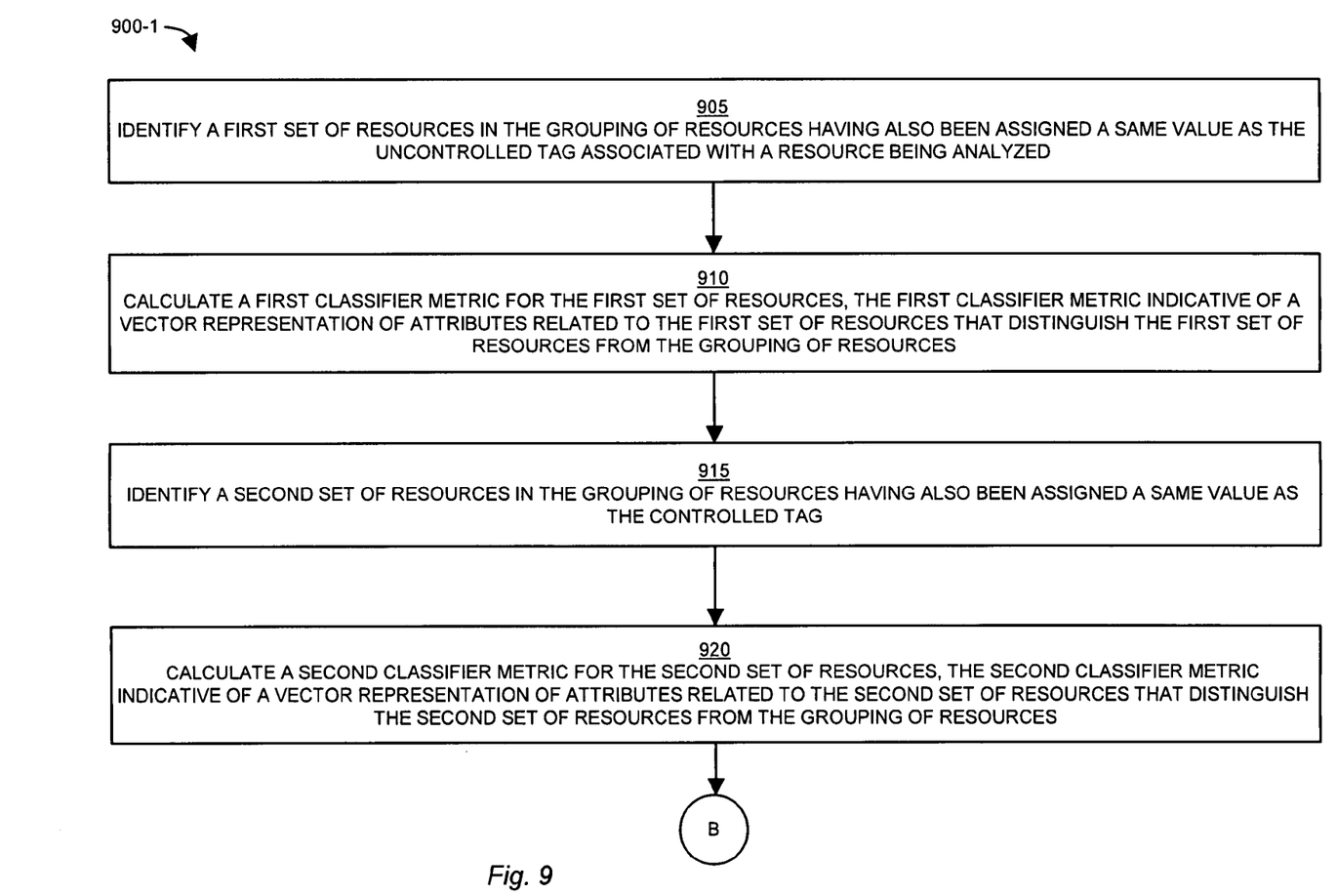
FIGS. 9 and 10 combine to form a flow chart of processing steps that shows processing operations performed by the resource analyzer in accordance with one example embodiment.
Figure 10:
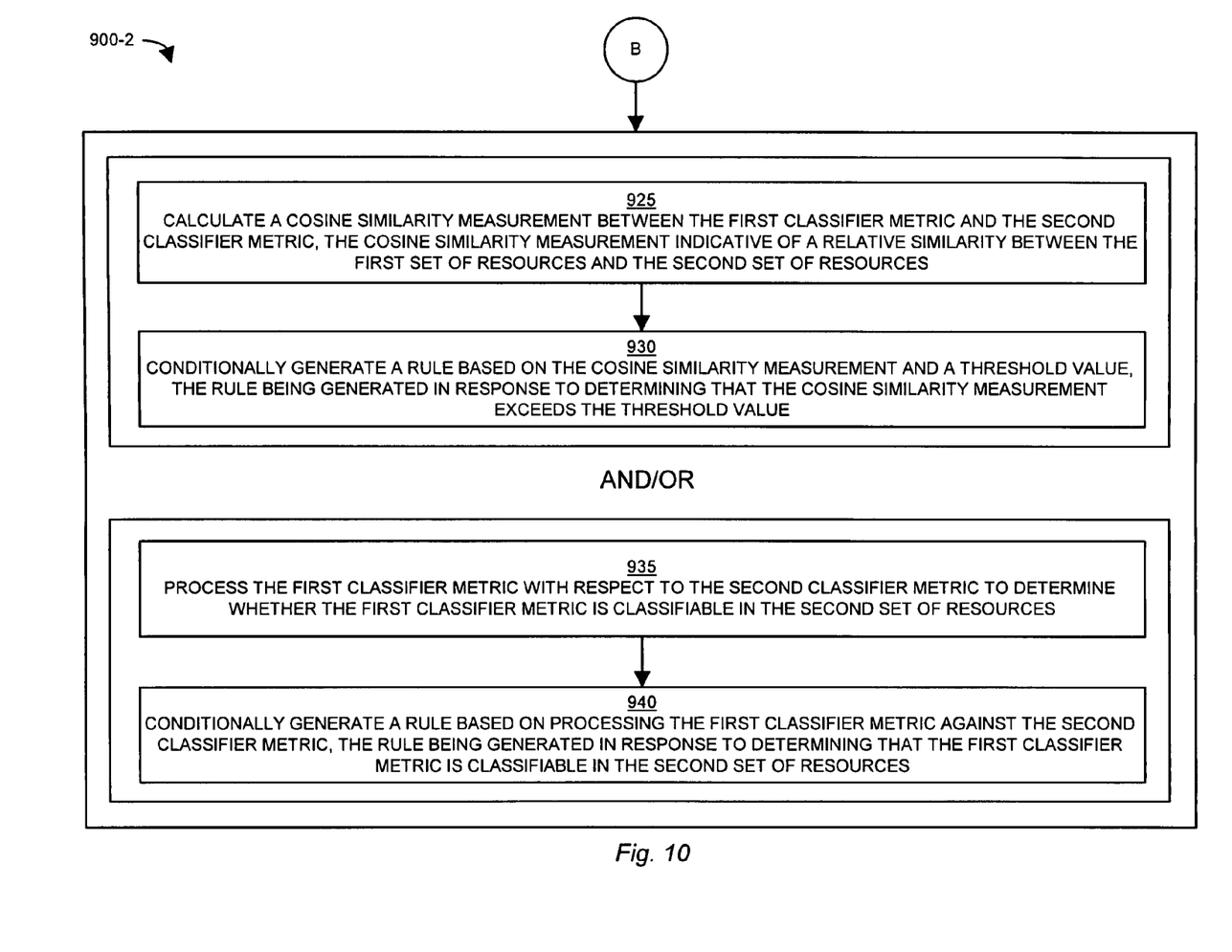

FIGS. 9 and 10 combine to form a flow chart 900 (e.g., flowchart 900-1 and flowchart 900-2) of processing steps that shows processing operations performed by the resource analyzer 150 in accordance with one example embodiment.

In step 905, the resource analyzer 150 identifies a first set of resources in the grouping of resources having also been assigned a same value as the uncontrolled tag.

In step 910, the resource analyzer 150 calculates a first classifier metric for the first set of resources. The first classifier metric is indicative of a vector representation of attributes (and attribute weights) related to the first set of resources that distinguish the first set of resources from the grouping of resources.

In step 915, the resource analyzer 150 identifies a second set of resources in the grouping of resources having also been assigned a same value as the controlled tag.

In step 920, the resource analyzer 150 calculates a second classifier metric for the second set of resources. In this manner, the second classifier metric indicative of a vector representation of attributes (and attribute weights) related to the second set of resources that distinguish the second set of resources from the grouping of resources.

In step 925, the resource analyzer 150 calculates a cosine similarity measurement between the first classifier metric and the second classifier metric. As its name suggests, the cosine similarity measurement is indicative of a relative similarity between the first set of resources and the second set of resources.

In step 930, the resource analyzer 150 conditionally generates a rule based on the cosine similarity measurement and a threshold value. The resource analyzer 150 generates the rule in response to determining that the cosine similarity measurement exceeds the threshold value.

In another example embodiment, the resource analyzer 150 creates a mapping based on the cosine similarity measurement and the threshold value. The mapping relates (or maps) the controlled tag to the uncontrolled tag. Such a mapping can be used in associating the controlled tag with a document also having the related (or mapped) uncontrolled tag.

Note that steps 935 and 940, below, discuss an alternate way for the resource analyzer 150 to conditionally generating a rule.

In step 935, the resource analyzer 150 processes the first classifier metric with respect to the second classifier metric to determine whether the first classifier metric is classifiable in the second set of resources.

In step 940, the resource analyzer 150 conditionally generates a rule based on processing the first classifier metric against the second classifier metric. The resource analyzer 150 generates the rule in response to determining that the first classifier metric is classifiable in the second set of resources.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What we claim is:

1. A non-transitory tangible computer-readable medium having instructions stored thereon, the instructions, when executed by a processing device, enabling the processing device to perform operations of:
   selecting a resource from a grouping of resources;
   wherein the grouping of resources includes one or more of: documents, web sites, bookmarks, audio files, and images;
   after selecting the resource, assigning a controlled tag to the selected resource;
   wherein the controlled tag is a first textual term selected from a controlled vocabulary including a finite and predetermined set of textual terms;
   after selecting the resource, assigning an uncontrolled tag to the selected resource;
   wherein the uncontrolled tag is a second textual term selected from an uncontrolled vocabulary including an open set of textual terms;
   identifying a first set of resources in the grouping of resources, each resource in the first set of resources having also been previously assigned the same uncontrolled tag;
   the same uncontrolled tag assigned to the first set of resources being the second textual term;
   identifying a second set of resources in the grouping of resources, each resource in the second set of resources having also been previously assigned the same controlled tag;
   the same controlled tag assigned to the second set of resources being the first textual term;
   producing a comparison result indicative of a similarity between the first set of resources and the second set of resources; and
   when the similarity exceeds a threshold value, generating a rule that for any resources that are assigned the second textual term as the uncontrolled tag and are not assigned the first textual term as the controlled tag, these resources will be assigned the first textual term as the controlled tag.

2. The medium as in claim 1, wherein the grouping of resources is a grouping of documents, the instructions, when executed by the processing device, further enabling the processing device to perform operations of:
   calculating a first ranking of terms for the first set of resources, the first ranking indicating a relative importance of distinctive terms contained in each document in the first set of resources; and
   calculating a second ranking of terms for the second set of resources, the second ranking indicating a relative importance of distinctive terms contained in each document in the second set of resources.

3. The medium as in claim 2, the instructions, when executed by the processing device, further enabling the processing device to perform the operations of:
   comparing terms in the first ranking with the terms in the second ranking; and
   in response to the comparing, determining a similarity value indicative of a relative similarity among the terms in the first ranking and the terms in the second ranking.

4. The medium as in claim 2, wherein calculating the first ranking of terms for the first set of resources includes:
   for each term in each respective document in the first set of resources, calculating a relative importance value for a given term by performing the steps of:
      determining a frequency of occurrence value for the given term in the document;
      determining a group occurrence value indicative of a number of documents in the grouping of resources in which the given term occurs; and
      using the frequency of occurrence value and group occurrence value to calculate the relative importance value for the given term.

5. The medium as in claim 2, wherein calculating the second ranking of terms for the second set of resources includes:
   for each term in each respective document in the second set of resources, calculating a relative importance value for a given term by performing the steps of:
      determining a frequency of occurrence value for the given term in the document;

determining a group occurrence value indicative of a number of documents in the grouping of resources in which the given term occurs; and using the frequency of occurrence value and the group occurrence value to calculate the relative importance value for the given term.

6. The medium as in claim 1, wherein producing the comparison result indicative of the similarity between the first set of resources and the second set of resources comprises:

conditionally generating a mapping based on a similarity of attributes in the first set of resources and attributes in the second set of resources, the mapping being generated in response to determining that attributes associated with the first set of resources are sufficiently similar to attributes associated with the second set of resources; and configuring the mapping to specify that, for a given resource having been assigned the uncontrolled tag, the given resource should also be associated with the controlled tag.

7. The medium of claim 6, the instructions, when executed by the processing device, further enabling the processing device to perform the operations of:

dynamically applying the mapping to a resource that has already been assigned the uncontrolled tag in the grouping of resources, the application of the mapping associating the controlled tag with the resource that has already been assigned the uncontrolled tag.

8. The medium as in claim 1, the instructions, when executed by the processing device, further enabling the processing device to perform the operations of:

calculating a first classifier metric for the first set of resources, the first classifier metric indicative of a vector representation of attributes related to the first set of resources that distinguish the first set of resources from the grouping of resources; and calculating a second classifier metric for the second set of resources, the second classifier metric indicative of a vector representation of attributes related to the second set of resources that distinguish the second set of resources from the grouping of resources.

9. The medium as in claim 8, the instructions, when executed by the processing device, further enabling the processing device to perform the operations of:

calculating a cosine similarity measurement between the first classifier metric and the second classifier metric, the cosine similarity measurement indicative of a relative similarity between the first set of resources and the second set of resources; and conditionally generating a rule based on the cosine similarity measurement and a threshold value, the rule being generated in response to determining that the cosine similarity measurement exceeds the threshold value.

10. The medium as in claim 8, wherein the grouping of resources is a grouping of documents, the instructions, when executed by the processing device, further enabling the processing device to perform the operations of:

processing the first classifier metric with respect to the second classifier metric to determine whether the first classifier metric is classifiable in the second set of resources; and conditionally generating a rule based on processing the first classifier metric against the second classifier metric, the rule being generated in response to determining that the first classifier metric is classifiable in the second set of resources.

11. The medium as in claim 1, wherein the grouping of resources is non-textual media including at least one of an audio resource and an image resource.

12. The medium as in claim 1, wherein the controlled tag is a textual term derived from a predefined vocabulary associated with the grouping of resources, and the uncontrolled tag is a textual term not necessarily derived from the predefined vocabulary.

13. The medium as in claim 1, the instructions, when executed by the processing device, further enabling the processing device to perform the operations of:

in response to identifying the first set of resources in the grouping of resources having also been assigned the same uncontrolled tag, generating the first set of resources to include a first resource and a second resource, each of which has a respective uncontrolled tag which is the same as the uncontrolled tag of the selected resource;

in response to identifying a second set of resources in the grouping of resources having also been assigned the same controlled tag, generating the second set of resources to include the second resource and a third resource, each of which has a respective controlled tag which is the same as the controlled tag of the selected resource.

14. The medium as in claim 13, wherein producing the comparison result further comprises:

generating a first attribute list including unique attributes associated with the first set of resources;

generating a second attribute list including unique attributes associated with the second set of resources; and comparing the first attribute list with the second attribute list to produce the comparison result.

15. A computer system comprising:

a processor;

a memory unit that stores instructions associated with an application executed by the processor; and an interconnect coupling the processor and the memory unit, enabling the computer system to execute the application and perform operations of:

selecting a resource from a grouping of resources;

wherein the grouping of resources includes one or more of: documents, web sites, bookmarks, audio files, and images;

after selecting the resource, assigning a controlled tag to the selected resource;

wherein the controlled tag is a first textual term selected from a controlled vocabulary including a finite and predetermined set of textual terms;

after selecting the resource, assigning an uncontrolled tag to the selected resource;

wherein the uncontrolled tag is a second textual term selected from an uncontrolled vocabulary including an open set of textual terms;

identifying a first set of resources in the grouping of resources having also been previously assigned the same uncontrolled tag;

the same uncontrolled tag assigned to the first set of resources being the second textual term;

identifying a second set of resources in the grouping of resources having also been previously assigned the same controlled tag;

the same controlled tag assigned to the second set of resources being the first textual term:

producing a comparison result indicative of a similarity between the first set of resources and the second set of resources; and when the similarity exceeds a threshold value, generating a rule that for any resources that are assigned the second textual term as the uncontrolled tag and are not assigned the first textual term as the controlled tag, these resources will be assigned the first textual term as the controlled tag.

16. The computer system as in claim 15, wherein the grouping of resources is a grouping of documents, the computer system further supporting operations of:

calculating a first ranking of terms for the first set of resources, the first ranking indicating a relative importance of distinctive terms contained in each document in the first set of resources;

calculating a second ranking of terms for the second set of resources, the second ranking indicating a relative importance of distinctive terms contained in each document in the second set of resources;

comparing terms in the first ranking with the terms in the second ranking; and in response to the comparing, determining a similarity value indicative of a relative similarity among the terms in the first ranking and the terms in the second ranking.

* * * * *